US011204110B2

(12) United States Patent
Gee

(10) Patent No.: US 11,204,110 B2
(45) Date of Patent: Dec. 21, 2021

(54) MOVABLE PIPE SUPPORT

(71) Applicant: CHS Inc., Inver Grove Heights, MN (US)

(72) Inventor: Michael A. Gee, Billings, MT (US)

(73) Assignee: CHS Inc., Inver Grove Heights, MN (US)

( * ) Notice: Subject to any disclaimer, the term of this patent is extended or adjusted under 35 U.S.C. 154(b) by 10 days.

(21) Appl. No.: 16/813,313

(22) Filed: Mar. 9, 2020

(65) Prior Publication Data
US 2021/0278017 A1    Sep. 9, 2021

(51) Int. Cl.
*F16L 3/18* (2006.01)
*F16L 3/02* (2006.01)
*F16L 3/015* (2006.01)

(52) U.S. Cl.
CPC .............. *F16L 3/18* (2013.01); *F16L 3/015* (2013.01); *F16L 3/02* (2013.01)

(58) Field of Classification Search
CPC ..... F16L 3/18; F16L 3/22; F16L 3/223; F16L 3/015; F16L 3/02
See application file for complete search history.

(56) References Cited

U.S. PATENT DOCUMENTS 5,107,633 A * 4/1992 Rose ................... B24C 3/32
451/76
5,944,288 A * 8/1999 Whitney ................ F16F 1/041
248/58

OTHER PUBLICATIONS

Lisega standard pipe support catalog dated: Jun. 2015 (Year: 2015).*
Binder Group Industrial pipe support reference guide edition Jun. 1, 2017 (Year: 2017).*

* cited by examiner

*Primary Examiner* — Eret C McNichols
*Assistant Examiner* — Ding Y Tan
(74) *Attorney, Agent, or Firm* — Brooks, Cameron & Huebsch, PLLC

(57) ABSTRACT

Movable pipe supports are described herein. A movable pipe support can include a pipe support apparatus body having a slot sized to accommodate a first end of a lever arm positioned such that it extends through the slot, a pipe support structure attached to the first end of the lever arm and having an outer surface for contacting an outer surface of the pipe, and a pivot mechanism to allow the outer surface of the pipe support structure to continue to be in contact with the outer surface of the pipe while the pivot mechanism moves the outer surface of the pipe support structure along the outer surface of the pipe.

13 Claims, 3 Drawing Sheets

MOVABLE PIPE SUPPORT

TECHNICAL FIELD

The present disclosure relates to movable pipe supports that support pipes when in use.

BACKGROUND

Pipes are used in many configurations and fields of technology to convey fluids and gasses from one place to another. For example, in the field of fuel delivery, pipes can convey raw petroleum and petroleum byproducts from one place to another.

They are used in many applications such as at refineries, natural gas installations, compressor stations, petroleum processing plants, and many other places. In petroleum processing plants, for example, there can be thousands of individual pipes running from place to place within, into, and out of the processing plant.

The pipes themselves can be heavy depending on the material of which they are made. Most often they are made from a metallic material, usually from steel or an alloy thereof. Supports can be used to take on some of the weight of the pipes and/or the weight of the material moving through the pipes.

This currently is accomplished in a couple of ways. One way is to place a strap around the outside surface of the pipe and suspend the strap from above the pipe. Another method is to build a support platform, with a support surface, such as the top of an I-beam under the pipe for the bottom surface of the pipe to rest on.

However, the metallic materials the pipes are made of can be susceptible to rust and corrosion. This corrosion typically forms on the bottoms of the pipes as gravity forces moisture collecting on the pipes downward toward the lowest point. In the areas where supports are present, the moisture also collects on the surfaces of the supports and where the supports contact the bottom of the pipe. These contact areas can be particularly problematic.

The United States federal government mandates that certain industrial piping be maintained and periodically inspected to determine if the pipes are in satisfactory condition and, if they are corroded, whether those corroded areas need to be addressed, for example, by cleaning, rust removal and treatment, or in severe cases, replacement of a section of the pipe. It is in the interest of the owner and maintainer of the pipe that the pipe be checked and cleaned or have the rust removed and the area treated often so that replacement of a section of pipe does not become necessary, as that results in substantial cost for materials, time for workers, and downtime for the movement of materials through the pipe.

However, although most of the pipe can be inspected and relatively easily maintained, the areas contacting the supports cannot be, as the supports cannot be removed without some difficulty. For example, in a traditional repair process, a new support will need to be positioned to hold the weight of the pipe before the old support can be removed. Oftentimes, there is no structure to hold the new support, so a temporary structure must be fabricated. Alternatively, the pipe can be lifted by a crane, but this is costly in time and labor.

These inspections, maintenance, and repairs should occur periodically during the life of the placement of the pipe. And, as such, the placement of temporary pipe supports must be done periodically, which is a substantial waste of time and effort for the owner and maintainer of the pipe.

DETAILED DESCRIPTION

Figure 1:
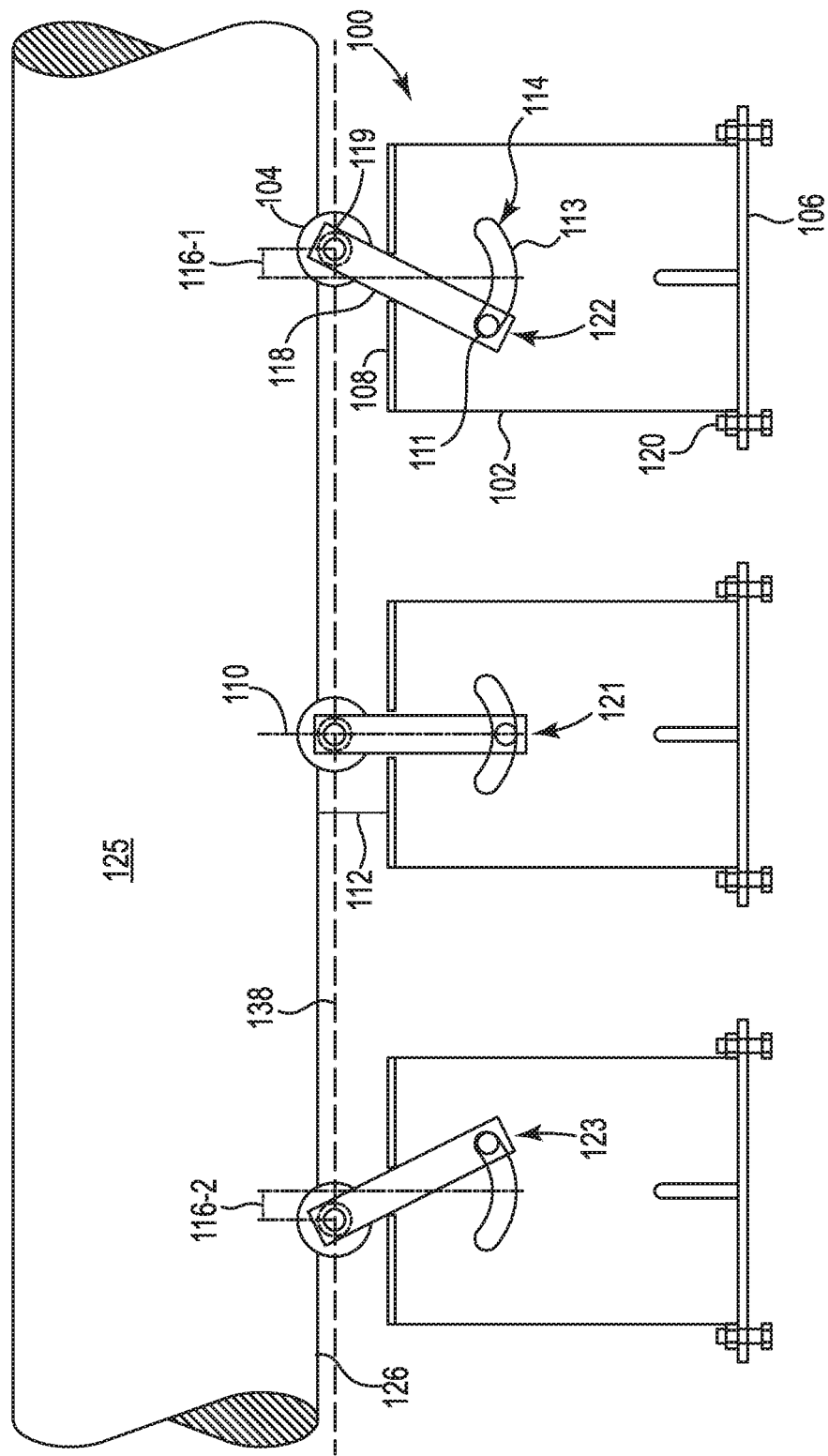
FIG. 1 illustrates a side perspective view of a pipe with multiple pipe supports supporting the pipe in accordance with one or more embodiments of the present disclosure.

Movable pipe supports are described herein. One movable pipe support embodiment can include a pipe support apparatus body having a slot sized to accommodate a first end of a lever arm positioned such that it extends through the slot, a pipe support structure attached to the first end of the lever arm and having an outer surface for contacting an outer surface of the pipe, and a pivot mechanism to allow the outer surface of the pipe support structure to continue to be in contact with the outer surface of the pipe while the pivot mechanism moves the outer surface of the pipe support structure along the outer surface of the pipe.

As discussed above, pipe supports can be used to support a length of pipe, but the areas in contact with the pipe supports can be more susceptible to corrosion and can be difficult to inspect, maintain, and/or repair. The embodiments of the present disclosure provide moveable pipe supports that can be moved, while still supporting the weight of the pipe. This arrangement provides several benefits.

One benefit is that the area of the pipe that is in contact with the pipe support can be changed from time to time. This allows for the area of contact between the pipe and the pipe support to be changed, thereby reducing the risk of corrosion at a particular location and potentially degrading the condition of one part of the pipe to the point where a section of pipe will need to be replaced.

Another benefit is that the support can be moved to allow for inspection and maintenance of the pipe. As used herein, maintenance refers to routine removal of coating material, such as paint or other materials applied to the surface of the pipe. By maintaining such materials, it may be possible to keep the surface of the pipe from becoming corroded, potentially for a prolonged period.

A further benefit is that the support can be moved to allow for inspection and repair of the pipe. As used herein, repair refers to removal of corrosion that has occurred. This may include sanding off the corroded surface of the pipe, cleaning the sanded surface, applying a corrosion inhibitor, and painting a coating over the repaired area, among other repair processes.

In the following detailed description, reference is made to the accompanying drawings that form a part hereof. The drawings show by way of illustration how one or more embodiments of the disclosure may be practiced.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things. For example, "a number of adjustable feet" can refer to one or more adjustable feet.

FIG. 1 illustrates a side perspective view of a pipe with multiple pipe supports supporting the pipe in accordance with one or more embodiments of the present disclosure. In the illustrated example, three pipe supports 100 are shown and for illustration purposes, the lever arms 118 are each in a different position, showing the range of movement of the pipe support structure 104 (e.g., a roller or other structure that can move along the surface 126 of the pipe 125). However, the components of the three pipe supports are the same and are presented to illustrate that multiple supports may be used, and to show the movement of the lever arm 118. For simplicity, not all components on each pipe support are given numbers, but it should be understood by the reader that each number representing a component on one pipe support in FIG. 1 can also be used to describe the same component on another one of the pipe supports shown in FIG. 1.

With regard to the movement of the lever arm 118 and pipe support structure 104, the middle pipe support has lever arm 118 and center of the pipe support structure 104 oriented along a center line 110 that is perpendicular to the surface 126 of the pipe 125. This provides one position of the pipe support structure on the pipe.

The pipe support on the right of the figure has the top end of the lever arm 118 offset from the center line 110 by a distance 116-1. Similarly, the pipe support on the left of the figure has the top end of the lever arm 118 offset from the center line 110 by a distance 116-2. The distances 116-1 and 116-2 can be the same, or different, in some embodiments.

The lever arm 118 also includes a pin 111 mounted to the second end of the lever arm. This pin is slidably positioned in slot 114. The movement of the pin 111 in slot 114 facilitates the movement of the lever arm between positions 121, 122, and 123. The embodiment of FIG. 1 allows the pin to be stopped at any point in the range between positions 122 and 123, which may be beneficial in some implementations.

Figure 2:
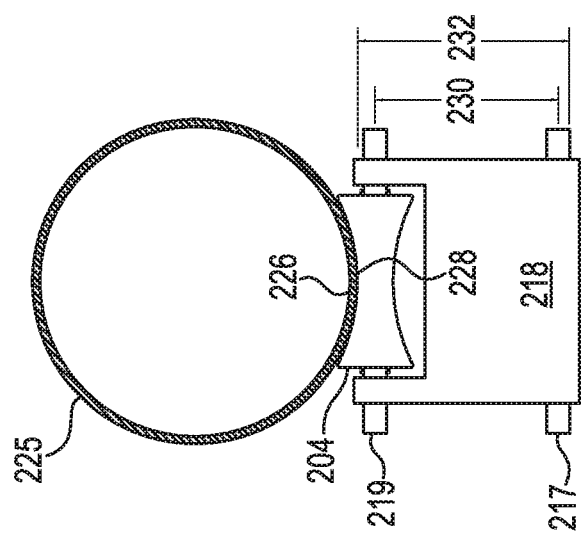
FIG. 2 illustrates a front perspective view of a pipe supported on a pipe support structure in accordance with one or more embodiments of the present disclosure.

In the embodiment shown in FIG. 1, it is important that the pipe support structure 104 be in contact with the pipe surface 126 as it moves between positions 121, 122, and 123. In the embodiment of FIG. 1, the pipe support structure is a roller having a circular cross section and having a central section with a circumference that is smaller than at least one other portion of the roller (as shown in FIG. 2 at 204). In such embodiments, the roller can be mounted to the end of the lever arm 118 by an axle 119.

In a design where the pipe support structure rotates (e.g., where a rotating roller is used), the shape of the circumference of the pipe support structure 104 and the shape of the slot 114 can be interrelated to achieve the constant contact of a surface of the pipe support structure 104 being in contact with the surface 126 of the pipe 125. For example, as illustrated in FIG. 1, a pipe support structure 104 having a circular circumference can be complimentarily designed with a curvature of the curved slot 114 to allow the center of the pipe support structure 104 to move along a line 138 parallel to the surface 126. In doing so, the pipe support structure stays the same distance away from the pipe and, thereby, provides continuous support for the pipe during the movement of the pipe support structure 104.

In some embodiments, it may be beneficial to use a pipe support structure that is made from a non-corrosive material, such as a non-metallic material, like rubber or nylon. As discussed herein, one suitable type of pipe support structure can be a roller and the roller can be fabricated from a non-corrosive material, like rubber or nylon. To allow the roller to support heavier loads, the roller may be formed around a tube (e.g., metallic tube) that allows an axle to be placed through the tube adding more support of the weight placed on the roller by the pipe is supporting.

The pipe support 100 illustrated in FIG. 1 also includes a body 102 having a number of sides (e.g., the embodiment illustrated in FIG. 1 includes four sides forming a rectangular cylinder, but any suitable shape can be used). The body also has a top 108 (positioned at one end of the rectangular cylinder) and a bottom 106 (positioned at the other end of the rectangular cylinder).

Figure 4B:
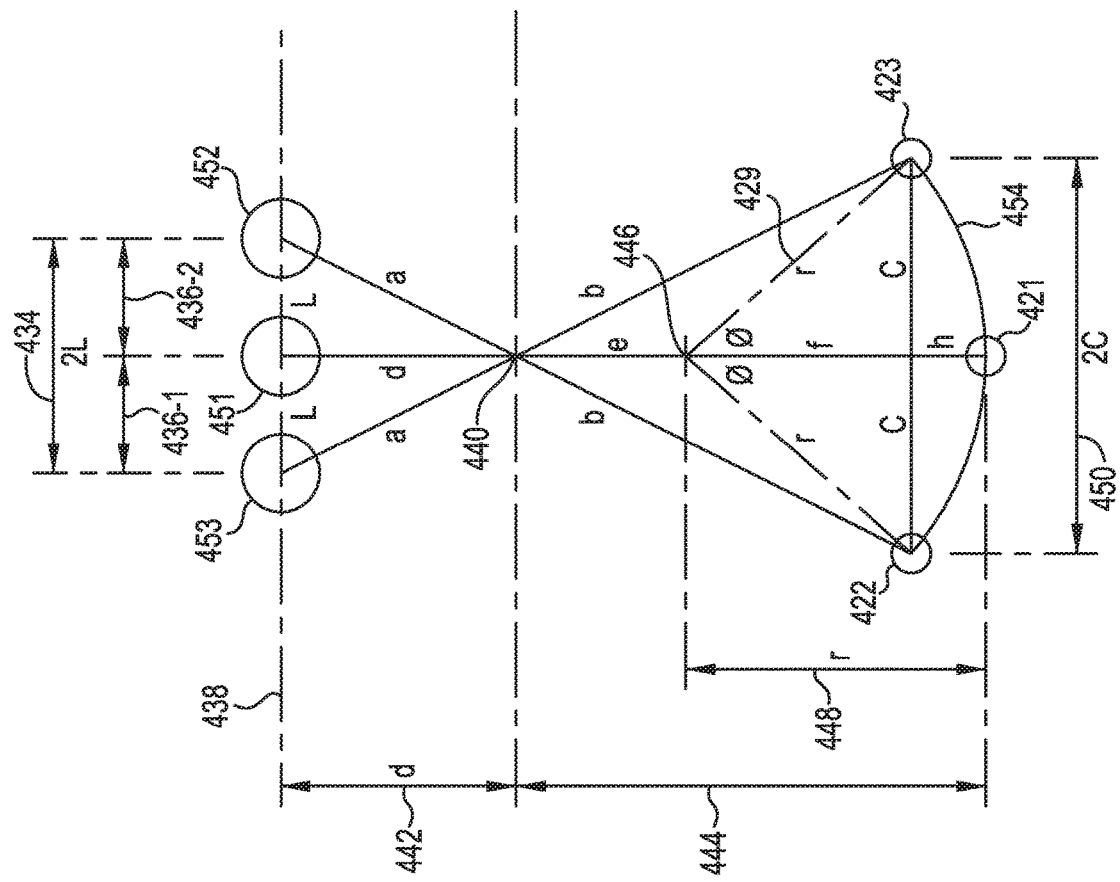
FIG. 4B illustrates the relative movements of the lever arm of a pipe support in accordance with one or more embodiments of the present disclosure.
Figure 4A:
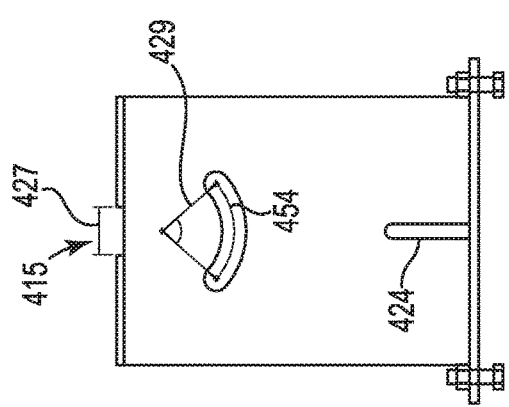
FIG. 4A illustrates a side perspective view of the body of a pipe support in accordance with one or more embodiments of the present disclosure.

The top includes a slot (indicated at 415 of FIG. 4A). The slot is sized to accommodate a first end of a lever arm 118 positioned such that it extends through the slot.

A pivot mechanism is used to allow the outer surface of the pipe support structure to continue to be in contact with the outer surface of the pipe while the pivot mechanism moves the outer surface of the pipe support structure along the outer surface of the pipe. The components of the pivot mechanism, for the embodiment of FIG. 1, include the curved slot 114, the pin 111, the lever arm 118, the slot in the top of the body (415 in FIG. 4A), and the pipe support structure 104.

Further, the curved slot 114 and pin 111 can form a lever arm stop structure wherein the bounds of the curved slot define the movement of the pin and, consequently, the lever arm. This includes the bottom edge 113 of the curved slot. The outer surface of the pin contacts the bottom edge to restrict the weight of the pipe from forcing the pin downward, this maintains contact between the pipe and the pipe support structure.

In some embodiments, the bottom 106 can include a number of feet 120. In such some embodiments, the feet 120 can be adjustable. In this manner, the pipe support can be placed on a surface under the pipe and the legs can be adjusted to position the pipe support structure 104 to take on the load of the pipe 125. Once the proper support for the pipe 125 is being provided, based on the adjustment of the distance 112 of the pipe support 100 with respect to the position of the pipe 125, the legs can be left in their adjusted positions or can be readjusted, if necessary.

Further, in some embodiments, each foot 120 can also be independently adjustable. This can be beneficial where the surface below the pipe, on which the pipe support is placed, is uneven. For example, if the surface is uneven, the feet can be independently adjusted so that the pipe support structure 104 is aligned so that it moves along line 138. For example, a center point of the axle 109 can move along the line 138.

FIG. 2 illustrates a front perspective view of a pipe supported on a pipe support structure in accordance with one or more embodiments of the present disclosure. As can be seen in this illustration, the pipe support structure 204 is attached to a lever arm 218.

In the embodiment of FIG. 2, the pipe support structure 204 is a roller and the attachment can be made via an axle 219 that passes through the middle of the roller allowing the roller to rotate around the axle. In non-rotating designs and other rotating designs, the pipe support structure can be attached in any suitable manner.

Also, FIG. 2 illustrates that the lever arm 218 include a number of pins 217 mounted to the opposite end of the lever arm from the pipe support structure. In FIG. 2, the lever arm has two pins mounted thereon on opposing sides of the lever arm. Such an embodiment can be used with a body having curved slots in two opposing sides of the body. Alternatively, a single continuous pin can be used to pass through the curved slots on the opposing sides of the body. Such embodiments can be beneficial in spreading the load to multiple pins rather than one and adds stability across the pipe support, among other benefits.

The lever arm can be fabricated from any suitable material. One example material would be hollow structural steel and sample dimensions would be 8 inches×2 inches×¼ inch.

FIG. 2 also includes two reference distances, from the centers of the pin to the center of the axle at 230 and from the lowest part of the outer surface of the pipe support structure that is contacting the pipe and the bottom edge of the pin at 232. These dimensions may be helpful in determining the overall dimensions of the pipe support.

In some embodiments, the roller can have a shaped surface 228 (e.g., curved) that is shaped to mate with a curvature of a portion of the outer surface 226 of the pipe 225. In this way, more surface area of the pipe can be supported thereby spreading the load on the pipe support across more area of the pipe support structure. This shape also more securely supports the pipe due to the cradling nature of the roller's shape.

Figure 3:
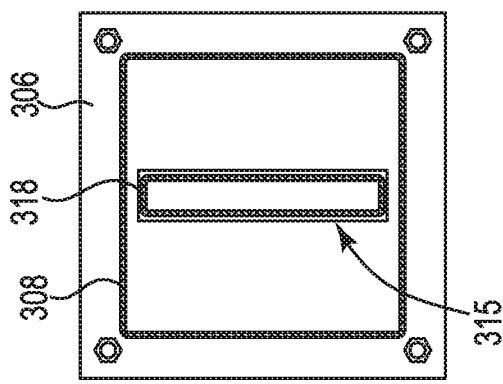
FIG. 3 illustrates a top perspective view of a body of a pipe support and a lever arm positioned in a slot in the top surface of the body in accordance with one or more embodiments of the present disclosure.

FIG. 3 illustrates a top perspective view of a body of a pipe support and a lever arm positioned in a slot in the top surface of the body in accordance with one or more embodiments of the present disclosure. As discussed herein, the body includes a bottom 306 and a top 308. The top 308 includes a slot 315 that is sized to accommodate a first end of a lever arm 318 positioned such that it extends through the slot. Preferably, the slot 315 has a width that is large enough to allow the pin (111 of FIG. 1) of the lever arm to move freely between the ends of the slot (114 of FIG. 1), but not so wide as to allow the force provided by the pipe support structure to the pipe surface to be substantially disrupted (e.g., such that the pipe could be damaged due to it being insufficiently supported).

FIG. 4A illustrates a side perspective view of the body of a pipe support in accordance with one or more embodiments of the present disclosure. FIG. 4B illustrates the relative movements of the lever arm of a pipe support in accordance with one or more embodiments of the present disclosure. FIGS. 4A and 4B describe the relationship between the curved slot (114 in FIG. 1) and the linear movement of the pipe support structure (104 of FIG. 1) along linear line (138 in FIGS. 1 and 438 in FIG. 4B).

FIG. 4A illustrates several components of the body and their relationship to each other. For example, the top of the body includes slot 415. As discussed above, slot 415 is sized to accommodate a first end of a lever arm positioned such that it extends through the slot. Preferably, the slot 415 has a width 427 that is large enough to allow the pin (111 of FIG. 1) of the lever arm to move freely between the ends of the slot (114 of FIG. 1), but not so wide as to allow the force provided by the pipe support structure to the pipe surface to be substantially disrupted (e.g., such that the pipe could be damaged due to it being insufficiently supported).

FIG. 4A also illustrates that the curvature of the curved slot can be based on an angle 429 and wherein the curved slot has a central curved axis 454. These components will be discussed in more detail below.

Lastly, FIG. 4A also provides a view of an access port (vertical slot) 424. The access slot can be used to access the interior of the body and can serve as a drainage port should water enter the interior of the body in implementations where the pipe support is exposed to the elements, such as rain, sleet, or snow.

FIG. 4B highlights the relationship between the pin and curved slot, the lever arm and slot in the top of the body, and the position of the pipe support structure and the pipe surface. The interrelationships between these components are critical to the continuous support of the pipe.

As discussed with respect to FIG. 1, the intent of this embodiment is to move the pipe support structure between positions 451, 452, and 453 by moving the pin in the curved slot between corresponding positions 421, 422, and 423. The corresponding movement is accomplished because the pipe support structure is mounted on one end of the lever arm and the pin is mounted at the other end of the lever arm. In FIG. 4B, the central axis of the lever arm in three different lever arm positions is represented by the lines spanning between locations 421/451, 422/452, and 423/453.

As can be seen in FIG. 4B, the lever arm has a pivot point 440 where the lever arm moves up and down through that point, but does not move side to side. In some applications this arrangement may not be so precise as to be a single point, so long as the movement does not allow the force provided by the pipe support structure to the pipe surface to be substantially disrupted.

The illustration of FIG. 4B also illustrates the distance 434 between positions 452 and 453 (and distances between 452 and 451 at 436-2 and 453 and 451 at 436-1) and the relation to the range of motion 450 of the pin as it moves between position 422 and 423. As can be seen by the differences of these distances, because the point 440 is closer (i.e., distance 442 versus distance 444) to the pipe support structure, the distance 434 is smaller than distance 450.

Further, if it was intended for the lever arm to rotate around its center (between its ends), the points 421, 422, 423, and 451, 452, and 453, would fall on the circumference of a circle. However, for the present disclosure it is desired that the pipe support structure travel linearly and, therefore, the pivot point 440 is not located at the center of the lever arm.

Another benefit of such an arrangement is that the pivot point is located higher up on the lever arm is so that there is better leverage in moving the pin along the curved slot. In other words, less force is needed to move the pin because the portion of the lever arm below the pivot point is longer than that above the pivot point.

Further, the curvature of the curved slot is important to the linear motion of the pipe support structure. As such, in order to maintain linear motion, the curvature of the slot 454 is based on the circumference having a center point at 446.

One suitable angle formed between the position 422 and 423 is 83 degrees, but the angle could be larger or smaller, in some embodiments. Other example measurements for such a suitable embodiment of the present disclosure include: 434=3 inches, 436-1 and 436-2=1.5 inches, 442=3 inches, 444=6 inches, 448=3.75 inches, and 450=5 inches. Provided below is some mathematical analysis of a geometry that can be used to create suitable pipe supports, such as those shown with respect to FIGS. 4A and 4B.

The following dimensions are provided by user: (letters shown in FIG. 4B)
2L=Linear Range of Motion for Roller Contact with Pipe
2C=Linear Range of Motion for Lower Lever Arm
a+b=d+e+f+h=Length of Lever Arm
In the case of one suitable design:
2L=3"; therefore L=1.5"
2C=5"; therefore C=2.5"
a+b=9"
and
d+e+f+h=9"

The following formula is used to determine the relationship between a & b:

$$a/b=L/C$$

$$a/b=1.5/2.5$$

$$2.5a=1.5b$$

$$a=(1.5/2.5)b$$

$$a=0.6b$$

Substituting this last equation into the following given equation:

$$a+b=9 \text{ (from provided dimensions)}$$

$$\text{produces: } 0.6b+b=9$$

$$1.6b=9$$

$$b=5.625$$

$$\text{then; } a=9-5.625=3.375$$

To find the length of d, the Pythagorean Theorem produces:

$$L^2+d^2=a^2$$

$$1.5^2+d^2=3.375^2$$

$$d^2=3.375^2-1.5^2$$

$$d=\sqrt{11.3903-2.25}$$

$$d=\sqrt{9.1406}$$

$$d=3.023 \text{ (3" to the nearest } 1/8 \text{")}$$

To find the length e+f, the Pythagorean Theorem also produces:

$$C^2+(e+f)^2=b^2$$

$$2.5^2+(e+f)^2=5.625^2$$

$$(e+f)=\sqrt{5.625^2-2.5^2}$$

$$e+f=\sqrt{31.6406-6.25}$$

$$e+f=\sqrt{25.3906}$$

$$e+f=5.0389$$

Substituting this last equation into the following given equation:

$$d+e+f+h=9 \text{ (from given dimensions)}$$

$$\text{produces: } d+5.0389+h=9$$

$$3.023+5.0389+h=9$$

$$h=9-3.023-5.0389$$

$$h=0.9381$$

The formula for the radius of an arc is: $h/2+(W^2)/8h$
Where h is the height measured at the midpoint of the arc's base;
and
W is the length of the chord defining the base of the arc.
In this case, the height is 0.9381 (drawing dimension "h") and the cord length is 5 (drawing dimension "2C").

$$\text{therefore; } r=0.9381/2+5^2/(8*0.9381)$$

$$r=0.4691+3.3312$$

$$r=3.8003 (3\tfrac{3}{4} \text{ to the nearest } 1/8\text{"})$$

The angle of the arc (2ø) can be determined as follows:

$$ø=\arcsin(C/r)$$

$$ø=\arcsin(2.5/3.8003)$$

$$ø=\arcsin(0.6578)$$

$$ø=41.13°$$

$$\text{then; } 2ø=82.26° \text{ (83° rounded up)}$$

Based on this mathematical methodology, a suitable design can be created for most pipe support applications.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

These embodiments are described in sufficient detail to enable those of ordinary skill in the art to practice one or more embodiments of this disclosure. It is to be understood that other embodiments may be utilized and that process and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A movable pipe support apparatus for supporting a pipe, comprising:
 a pipe support apparatus body having a slot sized to accommodate a first end of a lever arm positioned such that it extends through the slot;
 a pipe support structure attached to the first end of the lever arm and having an outer surface for contacting an outer surface of the pipe;
 a pivot mechanism to allow the outer surface of the pipe support structure to continue to be in contact with the outer surface of the pipe while the pivot mechanism moves the outer surface of the pipe support structure along the outer surface of the pipe; and
 wherein the body includes two opposing side surfaces and wherein at least one side surface includes a curved slot, a bottom edge of the curved slot provides a lever arm stop structure,
 wherein the lever arm incudes a pin attached to a second end of the lever arm and wherein the pin passes through the curved slot, and an outer surface of the pin contacts the bottom edge of the curved slot to stop the lever arm from moving downward.

2. The apparatus of claim 1, wherein the pipe support structure is a roller.

3. The apparatus of claim 1, wherein the roller has a curved surface that is shaped to mate with a curvature of a portion of the outer surface of the pipe.

4. The apparatus of claim 1, wherein the pipe support structure is attached to the lever arm by an axle that allows the pipe support structure to rotate around the axle.

5. The apparatus of claim 1, wherein the pipe support structure is attached to the lever arm by an axle that allows the pipe support structure to rotate about the axle and the pivot mechanism allows the outer surface of the pipe support structure to continue to be in contact with the outer surface of the pipe while the pivot mechanism moves the outer surface of the pipe support structure along the outer surface of the pipe while the pipe support structure rotates about the axle.

6. The apparatus of claim 1, wherein the pivot mechanism allows the outer surface of the pipe support structure to continue to be in contact with the outer surface of the pipe while the pivot mechanism moves the outer surface of the pipe support structure along the outer surface of the pipe and wherein a center point of an axle connecting the pipe support structure to the lever arm moves along a line parallel to an elongate axis of the pipe.

7. The apparatus of claim 1, wherein the pipe support apparatus body is a rectangular cylinder with a top at one end and wherein the top includes the slot.

8. The apparatus of claim 7, wherein the body includes a bottom at a second end of the rectangular cylinder.

9. The apparatus of claim 1, wherein the movement of the pipe support structure along the outer surface of the pipe is linear.

10. A movable pipe support apparatus for supporting a pipe, comprising:
 a pipe support apparatus body having top surface with a slot sized to accommodate a first end of a lever arm positioned to extend through the slot;
 a pipe support structure attached to the first end of the lever arm and having an outer surface for contacting an outer surface of the pipe;
 the body having a lever arm stop structure to maintain contact between the pipe and the pipe support structure;
 a pivot mechanism to allow the outer surface of the pipe support structure to continue to be in contact with the outer surface of the pipe while the pivot mechanism moves the outer surface of the pipe support structure along the outer surface of the pipe; and
 wherein the body includes two opposing side surfaces and wherein at least one side surface includes a curved slot, a bottom edge of the curved slot is the lever arm stop structure,
 wherein the lever arm incudes a pin attached to a second end of the lever arm and wherein the pin passes through the curved slot, and an outer surface of the pin contacts the bottom edge of the curved slot to stop the lever arm from moving downward.

11. A movable pipe support apparatus for supporting a pipe, comprising:
 a pipe support apparatus body having top surface with a slot sized to accommodate a first end of a lever arm positioned to extend through the slot;
 a pipe support structure rotatably attached to the first end of the lever arm and having an outer surface for contacting an outer surface of the pipe;
 the body having a lever arm stop structure to maintain contact between the pipe and the pipe support structure;
 a pivot mechanism to allow the outer surface of the pipe support structure to continue to be in contact with the outer surface of the pipe while the pivot mechanism rotates the outer surface of the pipe support structure along the outer surface of the pipe; and
 wherein the lever arm has an end surface at the first end and wherein the lever arm has a length and a pivot point located one third of the length of the lever arm from the end surface of the first end of the lever arm.

12. The apparatus of claim 11, wherein the body includes at least two independently adjustable legs.

13. The apparatus of claim 11, wherein the rotational movement of the pipe support structure along the outer surface of the pipe is linear.

* * * * *